(12) United States Patent
Zhang

(10) Patent No.: US 8,537,541 B2
(45) Date of Patent: Sep. 17, 2013

(54) LAPTOP HAVING DETACHABLE TOUCHPAD

(75) Inventor: Ming-Liang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 13/198,733

(22) Filed: Aug. 5, 2011

(65) Prior Publication Data

US 2012/0314347 A1 Dec. 13, 2012

(30) Foreign Application Priority Data

Jun. 9, 2011 (CN) .......................... 2011 1 0153214

(51) Int. Cl.
*G06F 1/16* (2006.01)
(52) U.S. Cl.
USPC ................ 361/679.55; 345/157; 710/303
(58) Field of Classification Search
USPC ............... 361/679.55, 679.01; 345/157, 156, 345/169
See application file for complete search history.

(56) References Cited

U.S. PATENT DOCUMENTS

| | | | | |
|---|---|---|---|---|
| 5,287,246 | A | * | 2/1994 | Sen ............................ 361/679.1 |
| 5,546,334 | A | * | 8/1996 | Hsieh et al. .................... 708/141 |
| 5,793,355 | A | * | 8/1998 | Youens .......................... 345/157 |
| 5,861,873 | A | * | 1/1999 | Kikinis ......................... 345/157 |
| 6,035,350 | A | * | 3/2000 | Swamy et al. .................. 710/73 |
| 6,163,326 | A | * | 12/2000 | Klein et al. .................... 345/156 |
| 6,166,722 | A | * | 12/2000 | Kawabe et al. ............... 345/169 |
| 6,369,798 | B1 | * | 4/2002 | Yatsu et al. .................... 345/167 |
| 6,859,355 | B2 | * | 2/2005 | Chuang et al. ............. 361/679.1 |
| 7,656,386 | B1 | * | 2/2010 | Goldbaum .................... 345/156 |
| 7,948,741 | B2 | * | 5/2011 | Fan ........................... 361/679.1 |
| 8,054,622 | B2 | * | 11/2011 | Song ........................ 361/679.55 |
| 8,072,423 | B2 | * | 12/2011 | Rolus Borgward ........... 345/157 |
| 8,139,347 | B2 | * | 3/2012 | Chiang et al. ............. 361/679.18 |
| 8,149,224 | B1 | * | 4/2012 | Kuo et al. ..................... 345/173 |
| 2008/0270665 | A1 | * | 10/2008 | Senatori et al. ............... 710/303 |

* cited by examiner

*Primary Examiner* — Lisa Lea Edmonds
(74) *Attorney, Agent, or Firm* — Altis Law Group, Inc.

(57) ABSTRACT

A laptop includes a main body and a touchpad. The main body includes a housing which defines a receiving groove. The touchpad is detachably received in the receiving groove. The laptop further includes an ejection mechanism to eject the touchpad up from the receiving groove to allow the touchpad to be used independently as an external mouse.

8 Claims, 6 Drawing Sheets

LAPTOP HAVING DETACHABLE TOUCHPAD

BACKGROUND

1. Technical Field

The present disclosure relates to a laptop having a touchpad.

2. Description of Related Art

Laptops are usually integrated with a touchpad to facilitate the operation of the laptops. However, sometimes operation by an external mouse is desired. In this situation, the external mouse must be obtained, and then connected to the laptop, which is inconvenient in the extreme.

Therefore, it is desirable to provide a laptop, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
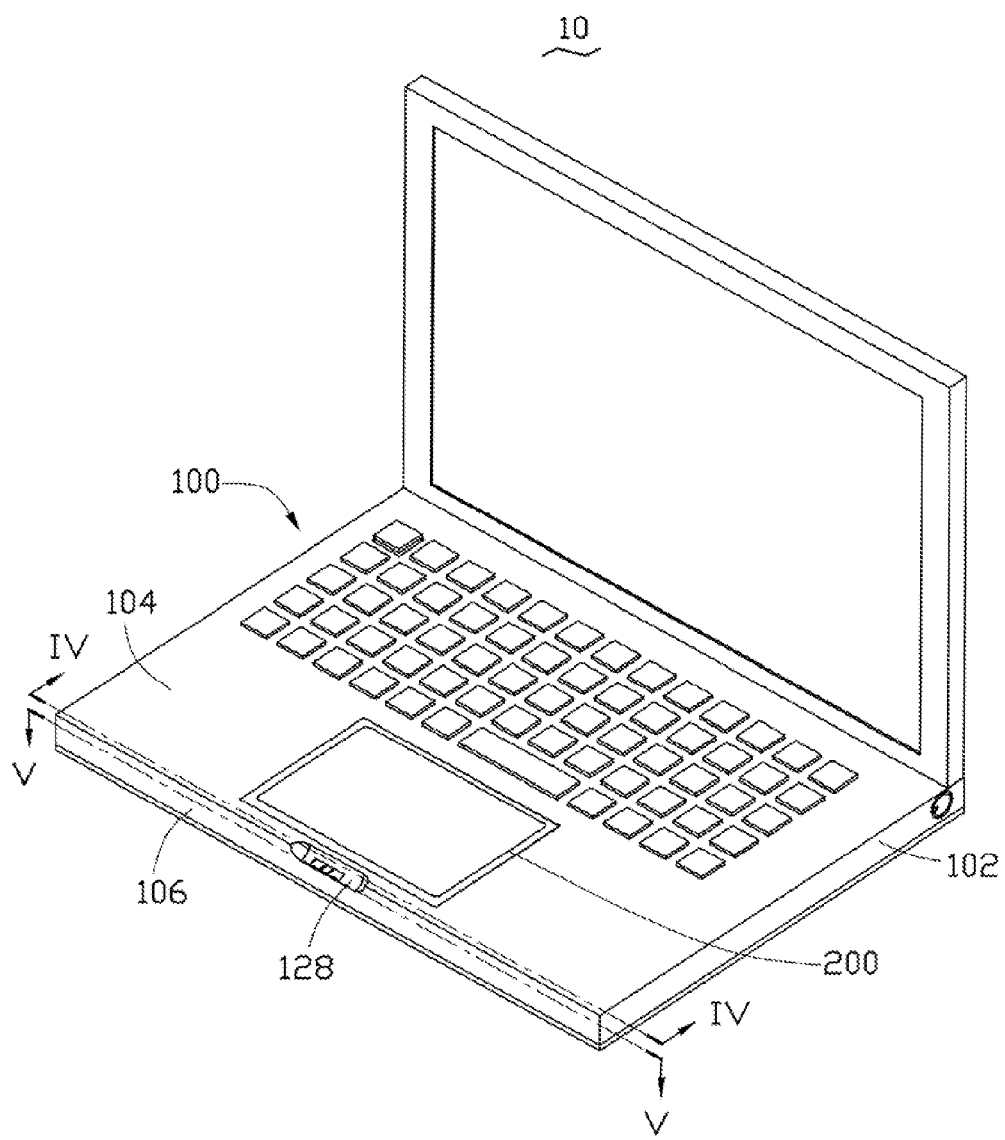
FIG. 1 is an isometric, and schematic view of an assembled laptop, according to an embodiment.
Figure 2:
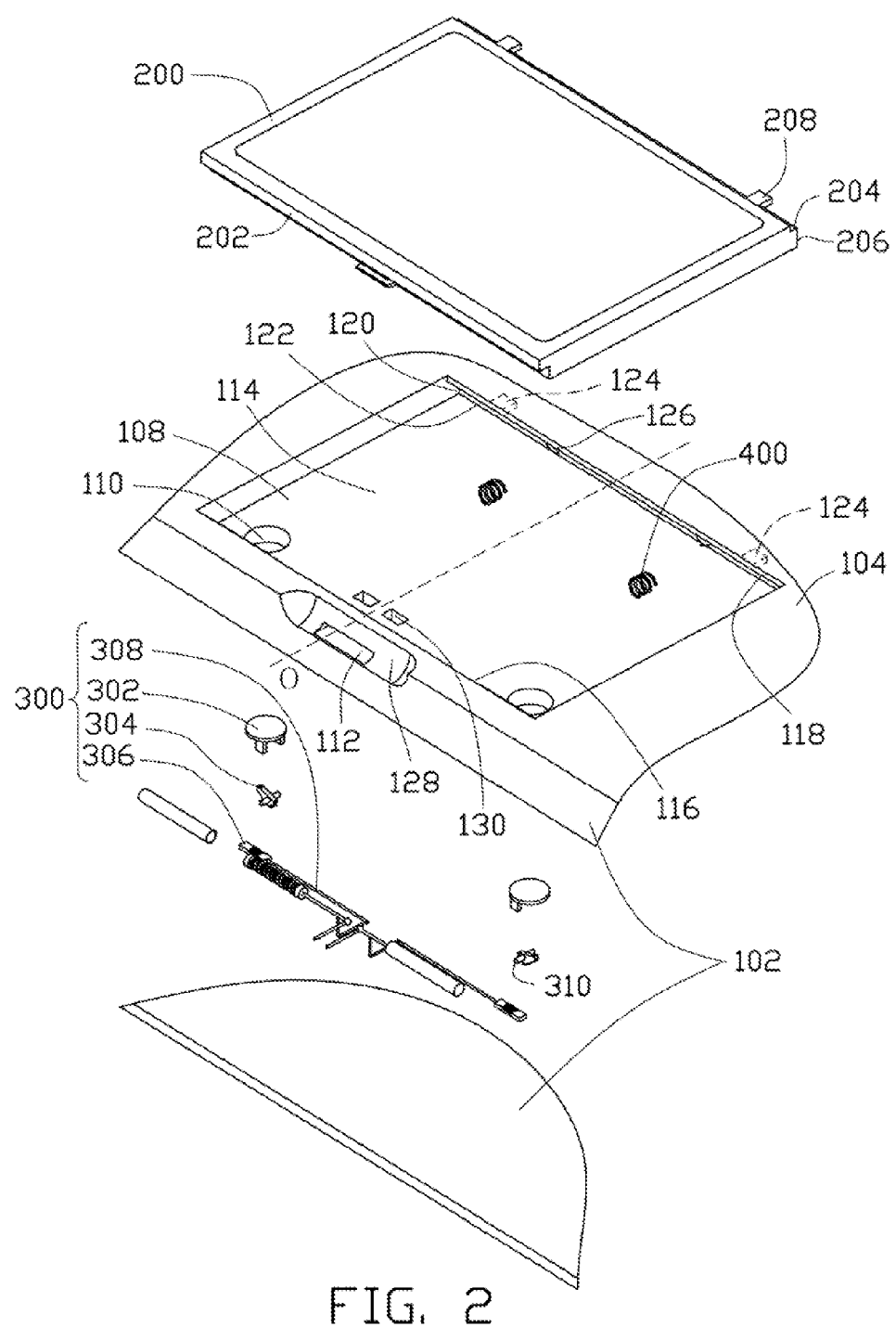
FIG. 2 is an isometric, exploded, and schematic view of a portion of the laptop of FIG. 1.
Figure 3:
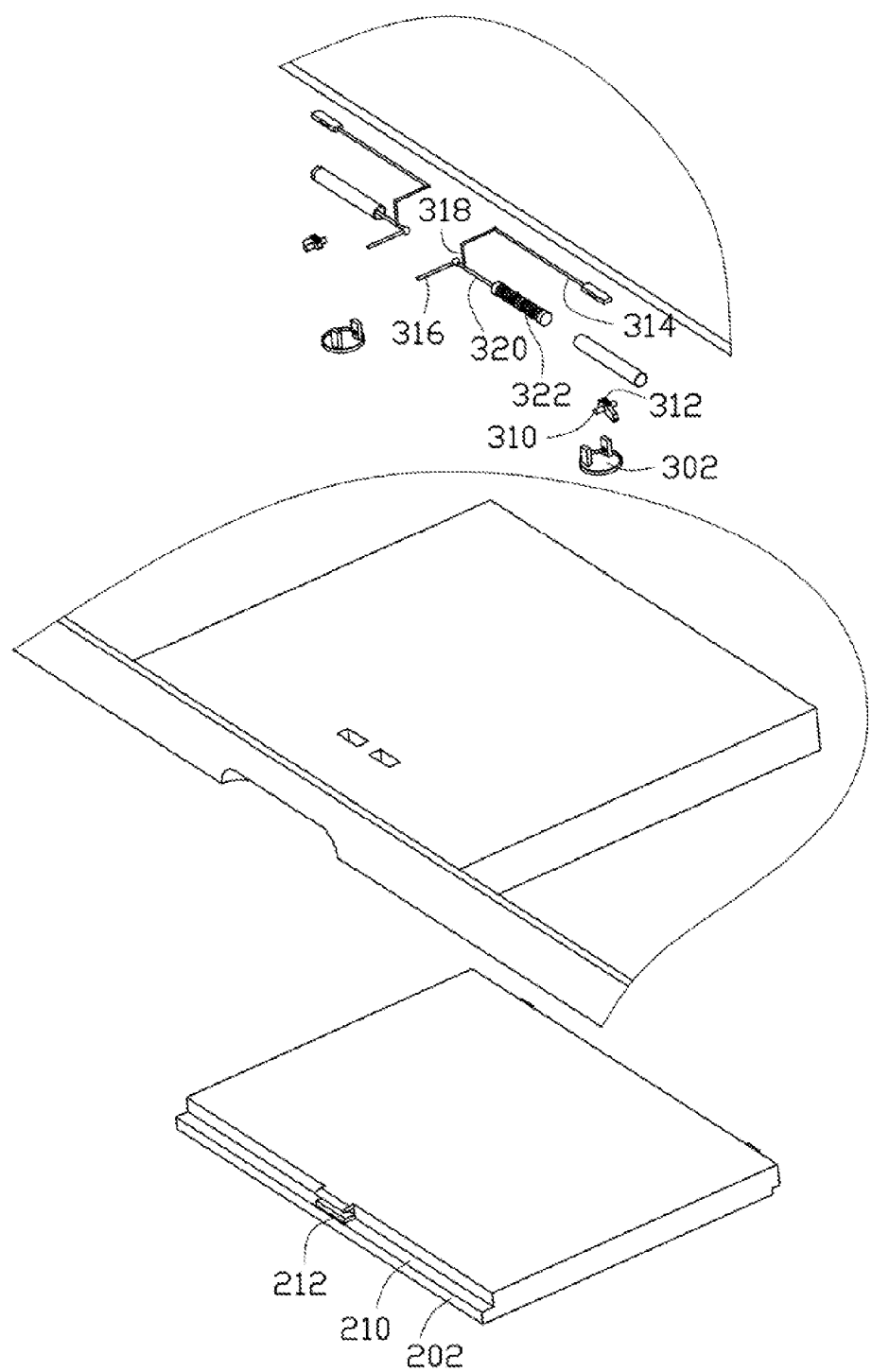
FIG. 3 is another isometric, exploded, and schematic view of a portion of the laptop of FIG. 1, viewed from another angle.

Referring to FIGS. 1-3, a laptop 10, according to an embodiment, includes a main body 100, a touchpad 200, and an ejection mechanism 300.

The main body 100 is cuboid and includes a housing 102. The housing 102 includes a rectangular keyboard surface 104 and a body sidewall 106. The housing 102 defines a receiving groove 108 in the keyboard surface 104, adjacent to the body sidewall 106, two circular first through holes 110 in a rectangular bottom surface 114 of the receiving groove 108, and a rectangular second through hole 112 in the body sidewall 106 between the two first through holes 110. The second through hole 112 is elongated, extending along a direction substantially parallel to the body sidewall 106.

The touchpad 200 is shaped so as to be received in the receiving groove 108 but is slidable on the same plane as the keyboard surface 104. That is to say, the touchpad 200 is also cuboid and while there is a simple fitting clearance between the sides of the touchpad 200 and the sidewalls of the receiving groove 108, the touchpad 200 has substantial front and rear clearance. The touchpad 200 can be wirelessly connected with the main body 100 by means of Bluetooth or a similar technology.

The ejection mechanism 300 includes two ejection headers 302, two spiral cams 304, two racks 306, and two linkage rods 308.

Each ejection header 302 includes a circular ejection plate and a pair of connection plates (none labeled). Each ejection plate is shaped so as to be received in the corresponding first through hole 110 and is slidable depthwise in the first through hole 110. The pair of connection plates are diametrically arranged and extend from the underside (ie. the bottom surface) of the ejection plate. Each connection plate defines a hole, the holes in each pair of connection plates are aligned with each other.

Each spiral cam 304 includes an axle 310 and a toothed side surface 312. Each axle 310 is a shaft on which the corresponding spiral cam 304 may rotate. Each toothed side surface 312, viewed parallel to the direction of the corresponding axle 310, has a spiral contour of which the center is aligned with the corresponding axle 310.

Each rack 306 is a rectangular strip having one toothed surface, and is configured for engaging with the toothed side surface 312 of the corresponding spiral cam 304.

Each linkage rod 308 is made of wires and includes a drive wire 314 (e.g., a straight wire) and an operation wire 316 (e.g., a straight wire) connecting to and substantially perpendicular to the drive wire 314.

Figure 4:
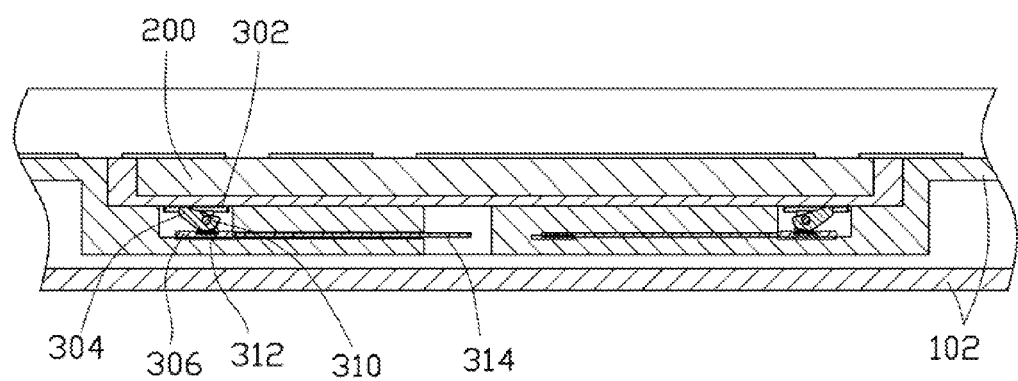
FIG. 4 is a cross-sectional view of part of the laptop, taken along a line IV-IV of FIG. 1.
Figure 5:
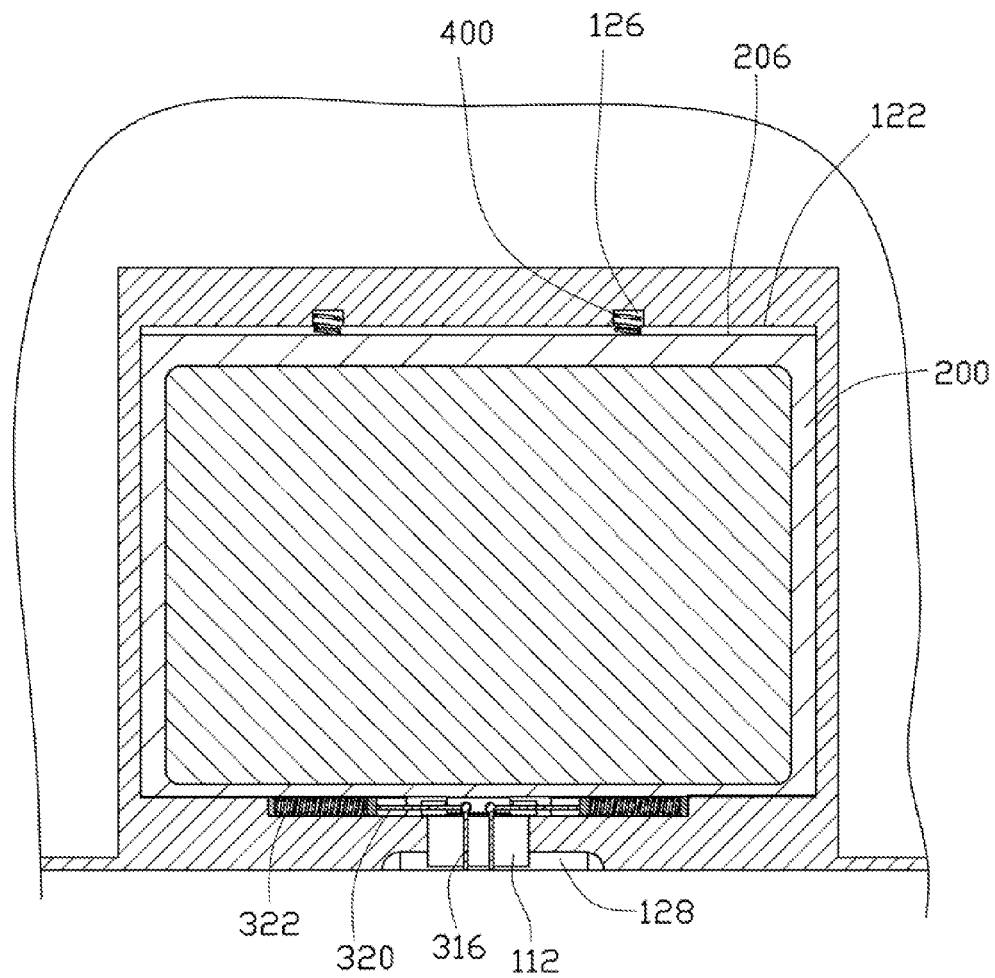
FIG. 5 is a cross-sectional view of part of the laptop, taken along a line V-V of FIG. 1.

Also referring to FIGS. 4 and 5, in assembly, the ejection mechanism 300 is received in the housing 30, wherein the linkage rods 308 are located at two sides of the second through hole 112. The operation wires 316 protrude from the housing 30 through the second through hole 112 along a direction substantially perpendicular to the body sidewall 106 and are slidable in the elongated second through hole 112 (that is, in a direction substantially parallel to the keyboard surface 104). The drive wires 314 are arranged lengthwise in the body sidewall 106. The racks 306 are respectively connected to the ends of the respective drive wires 314 opposing the respective operation wires 316. The ejection plates are received in the respective first through holes 110. Each spiral cam 304 is rotatably connected to the corresponding ejection header 302 by inserting the corresponding axle 310 into the corresponding pair of shaft holes and each toothed side surface 312 engages with a corresponding rack 306, such that, when the operation wires 316 are pushed towards each other, the distance between each axle 310 and a point of the corresponding toothed side surface 312 engaging with the corresponding rack 306 increases.

Figure 6:
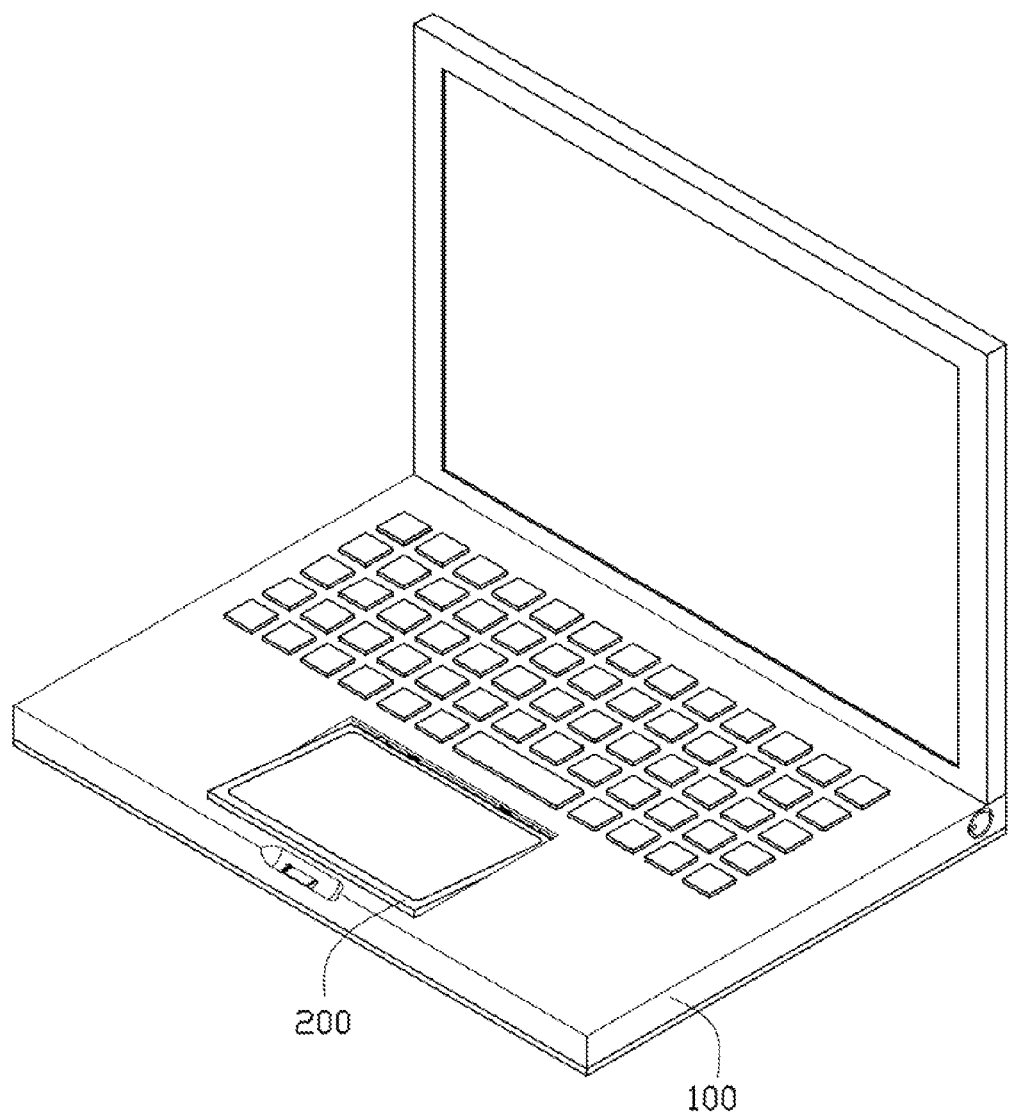
FIG. 6 is another isometric, schematic view of the assembled laptop of FIG. 1, in another state.

Thus, in operation, when the operation wires 316 are pushed towards each other, the ejection headers 302 are forced to slide upwards in the first through holes 110, so ejecting the touchpad 200 up from the receiving groove 108 (see FIG. 6). Then the touchpad 200 can be detached from, but remain wirelessly connected to, the main body 100 and may function as an external mouse.

The spiral cams 304 can be inversely arranged. That is, the spiral cams 304 can be arranged such that when the operation wires 316 are pulled away from each other, the distance between each axle 310 and the point of the corresponding toothed side surface 312 engaging with the corresponding rack 306 increases. Thus, by pulling the operation wires 316 away from each other instead of pushing, the touchpad 200 can be ejected up.

In alternative embodiments, the ejection of the touchpad 200 can be accomplished utilizing only one of the headers 302, one of the cams 304, one of the racks 306, and one of the linkage rods 308. The linkage rod 308 can be employed to apply pressure to only one location on the touchpad 200.

The shapes of the receiving groove 108, the first through holes 110, the second through hole 112, and the touchpad 200 are not limited to this embodiment, but can take other effective forms in alternative embodiments.

Referring to FIGS. 2-3, the receiving groove 108 is bounded by, in addition to the bottom surface 114, a rectangular first inner sidewall 116 opposite to the body sidewall 106, and a rectangular second inner sidewall 118 facing the first inner sidewall 116. Both the first inner sidewall 116 and the second inner sidewall 118 are perpendicularly connected to the bottom surface 114. The housing 100 forms cuboid engaging grooves 120 in the second inner sidewall 118, adjacent to the surface 114 and extending as wide as the second inner sidewall 118 along the direction parallel to both the bottom surface 114 and the second inner sidewall 118.

Corresponding to the receiving groove 108, the touchpad 200 includes a rectangular first outer sidewall 202 corresponding to the first inner sidewall 116, and a rectangular second outer sidewall 204 corresponding to the second inner sidewall 118. The touchpad 200 includes a cuboid engaging block 206 extending up from the second outer sidewall 204 and corresponding to the engaging groove 120. The engaging block 206 is as wide as the touchpad 200 along the direction parallel to both the second outer sidewall 204 and the upper surface of the touchpad 200.

Therefore, when the touchpad 200 is received in the receiving groove 108, the engaging block 206 is inserted into the engaging groove 120 to secure the touchpad 200 in the receiving groove 108.

The engaging groove 120 is bounded by a rectangular third inner sidewall 122 facing the first inner sidewall 116. The housing 102 further defines two rectangular engaging holes 124 in the third inner sidewall 116, away from the bottom surface 114 and adjacent to the two ends of the third inner sidewall 116. The engaging block 206 includes two rectangular engaging pins 208 extending therefrom and corresponding to the respective engaging holes 124.

Therefore, when the touchpad 200 is received in the receiving groove 108, the engaging pins 208 are inserted into the respective engaging holes 124 to further secure the touchpad 200 in the receiving groove 108.

The housing 102 further forms two circular receiving holes 126 in the third inner sidewall 122, adjacent to the two ends of the third inner sidewall 122 but between the engaging holes 124. The laptop 10 further includes two first coil springs 400. The first coil springs 400 are received in the respective receiving holes 126, and are compressed when installing the touchpad 200 into the receiving groove 108, and compress the touchpad 200 against the first inner sidewall 116 to further secure the touchpad 200 in the receiving groove 108.

The shapes of the engaging groove 120, the engaging block 206, the engaging holes 124, the engaging pins 208, and the receiving holes 126 are not limited to this embodiment, but can take other effective shapes in other embodiments.

The housing 102 can further form a curved cutout 128 in the intersection of the keyboard surface 104 and the body sidewall 106 which corresponds to the second through hole 112 to facilitate manual operations on the operation wires 316 therein.

The second through hole 112 extends through the first inner sidewall 116. The housing 102 further form two rectangular third through holes 130 in the bottom surface 114, adjacent to the first inner sidewall 116 and corresponding to the second through hole 112. Each linkage rod 308 includes a first connection wire 318 and a second connection wire 320. Each first connection wire 318 connects and is substantially perpendicular to both the corresponding drive wire 314 and the corresponding operation wire 316. Each second connection wire 320 is parallel to the corresponding drive wire 314 and directly connects and is substantially perpendicular to both the corresponding first connection wire 318 and to the corresponding operation wire 316.

The touchpad 200 forms a sliding groove 210 in the first outer sidewall 202, adjacent to the bottom surface of the touchpad 200 and extending the width of the first outer sidewall 202 along a direction parallel to both the first outer sidewall 202 and the upper surface of the touchpad 200.

In assembly, the first connection wires 318 extend through the respective third through holes 130, and may slide within the third through holes 130 (i.e., in a direction substantially perpendicular to the bottom surface 114). The second connection wires 320 are received in the sliding groove 210 and may slide in a direction parallel to both the bottom surface 114 and the first inner sidewall 116.

The touchpad 200 may include a pair of guiding plates 212 extending from a sidewall of the sliding groove 210 which cooperatively guide the sliding movement of the second connection wires 320 in the sliding groove 210.

The ejection mechanism 300 further includes two second coil springs 322. The second coil springs 322 are received in the sliding groove 210. Each second spring 322 connects the corresponding second connection wire 320 with the housing 102. When the touchpad 200 is received in the receiving groove 108, the second coil springs 322 are their natural length. When operating the operation wires 316, the second connection wires 320 slide within the sliding groove 210 along with the respective wires 316 and thus cause the second coil springs 322 to stretch or be compressed. Thus, when the operation wires 316 are released, the linkage rods 308, the racks 306, the spiral cams 304, and the ejection headers 302 are all restored to their original respective positions by the second coil springs 322.

The engaging holes 124, the engaging pins 208, the receiving hole 126, the first coil springs 400, the first through holes 110, the third through holes 130, and the ejection mechanism 300 are symmetrical about a central axis O of the receiving groove 108 which is substantially perpendicular to the body sidewall 106.

The above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A laptop comprising:
a main body comprising a housing, the housing comprising a keyboard surface and a body sidewall connecting the keyboard surface, the housing defining a receiving groove in the keyboard surface adjacent to the body sidewall, a first through hole in a bottom surface of the receiving groove adjacent to the body sidewall, and a second through hole in the body sidewall aligned with the receiving groove;
a touchpad received in the receiving groove and capable of sliding in the receiving groove along a direction that is substantially perpendicular to the body sidewall; and
an ejection mechanism receiving in the housing and comprising:
an ejection header fittingly received in the first through hole and capable of sliding along a depthwise direction of the first through hole;

a spiral cam having an axle and a spiral toothed side surface, the spiral cam being rotatably connected to the ejection header via the axle;

a rack arranged along a direction that is substantially parallel to both the keyboard surface and the body sidewall and engaged with the toothed side surface; and a linkage rod comprising a drive wire and an operation wire, the drive wire being arranged along the direction that is substantially parallel to both the keyboard surface and the body sidewall and connected to the rack, the operation wire being arranged along a direction that is substantially perpendicular to the body sidewall, protruding from the housing via the second through hole, and connecting to the drive wire;

wherein the spiral cam is arranged such that, when pushing the operation wire along the direction that is substantially parallel to both the keyboard surface and the body sidewall towards a predetermined direction, a distance between the axle and a point of the tooted side surface engaging the rack increases so as to drive the ejection header move towards the touchpad to eject the touchpad up.

2. The laptop of claim 1, wherein the receiving groove is cuboid and bounded by, in addition to the bottom surface, a first inner sidewall opposing the body sidewall, a second inner sidewall facing the first inner sidewall, the first inner sidewall and the second inner sidewall are substantially perpendicular to the bottom surface, the housing defines an engaging groove in the second inner sidewall adjacent to the bottom surface, the touchpad is cuboid and comprises a first outer sidewall corresponding to the first inner sidewall and a second outers sidewall corresponding to the second inner sidewall, and the touchpad comprises an engaging block extending from the second inner sidewall into the engaging groove.

3. The laptop of claim 2, wherein the engaging groove is bounded by a third inner sidewall facing the first inner sidewall, the housing defines an engaging hole in the third inner sidewall away from the bottom surface, and the touchpad comprises an engaging pin extending from the engaging block into the engaging hole.

4. The laptop of claim 3, wherein the housing defines a receiving hole in the third inner sidewall, the laptop further comprises a spring received in the receiving hole and compressed between the housing and the touchpad when the touchpad is received in the receiving groove.

5. The laptop of claim 2, wherein the second through hole extends through the first inner sidewall, the housing further defines a third through hole in the bottom surface adjacent to the first inner sidewall and corresponding to the second through hole, the linkage rod comprises a first connection wire extending through the third through hole along a direction that is substantially perpendicular to the keyboard surface and a second connection wire parallel to the drive wire and connecting the first connection wire and the operation wire, the touchpad defines a sliding groove in the first outer sidewall adjacent to the bottom surface, the second connection wire is received in the sliding groove and slidable along the sliding groove.

6. The laptop of claim 5, wherein the touchpad comprises a pair of guiding plates extending into the sliding groove for guiding the second connection wire to slide.

7. The laptop of claim 5, wherein the ejection mechanism comprises a second spring received in the sliding groove, the second spring is in a natural state when the touchpad is totally received in the receiving groove and is compressed or stretched when the touchpad is ejected.

8. The laptop of claim 1, wherein the housing defines a curved cutout in an intersection between the keyboard surface and the body sidewall and communicating with the second through hole to facilitate finger operations.

* * * * *